Dec. 22, 1936.  W. F. OLIVER  2,065,017
HYDRAULIC BRAKE
Filed June 6, 1932  2 Sheets-Sheet 1
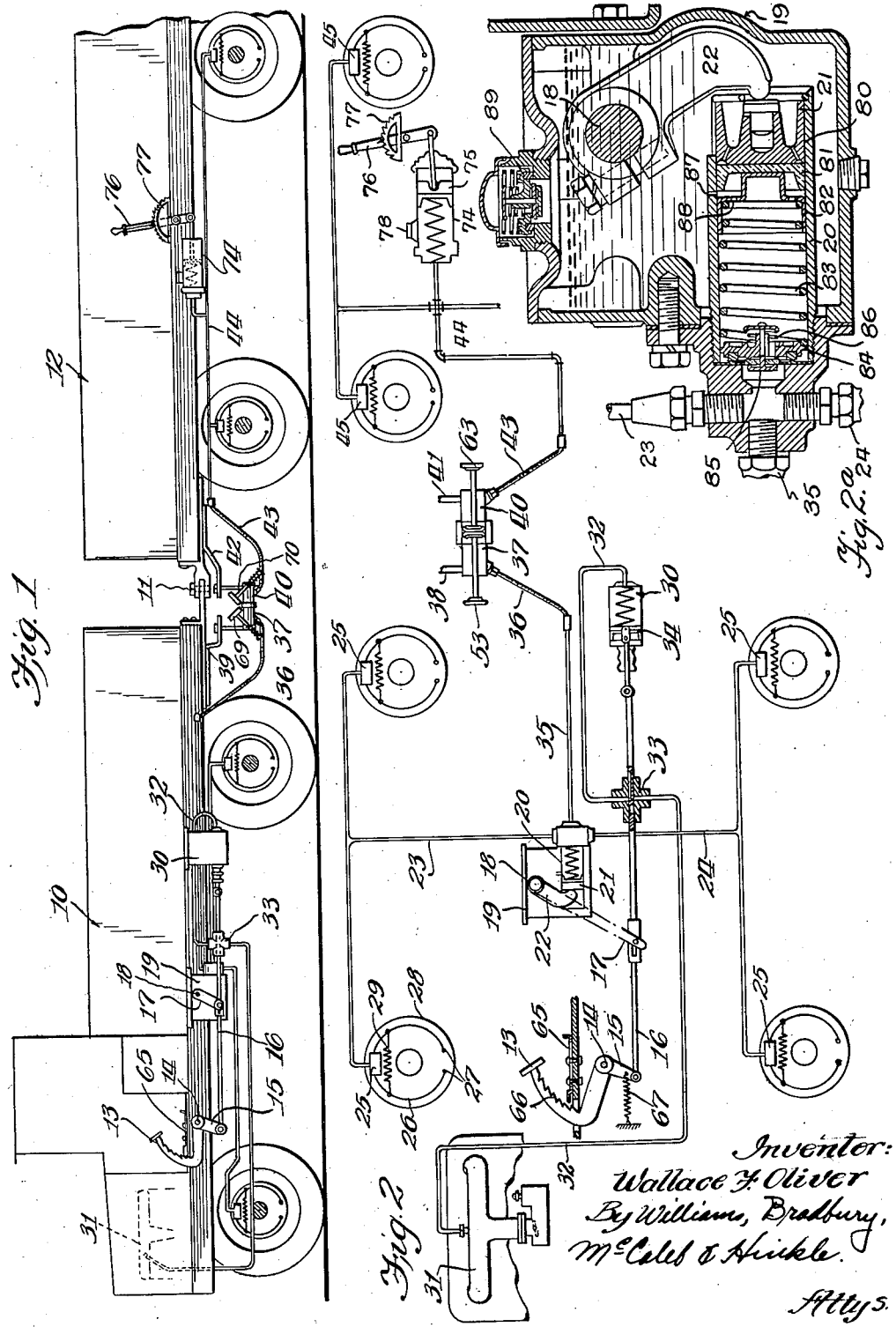
Inventor:
Wallace F. Oliver
By Williams, Bradbury,
McCaleb & Hinkle.
Attys.

Dec. 22, 1936.  W. F. OLIVER  2,065,017
HYDRAULIC BRAKE
Filed June 6, 1932  2 Sheets-Sheet 2
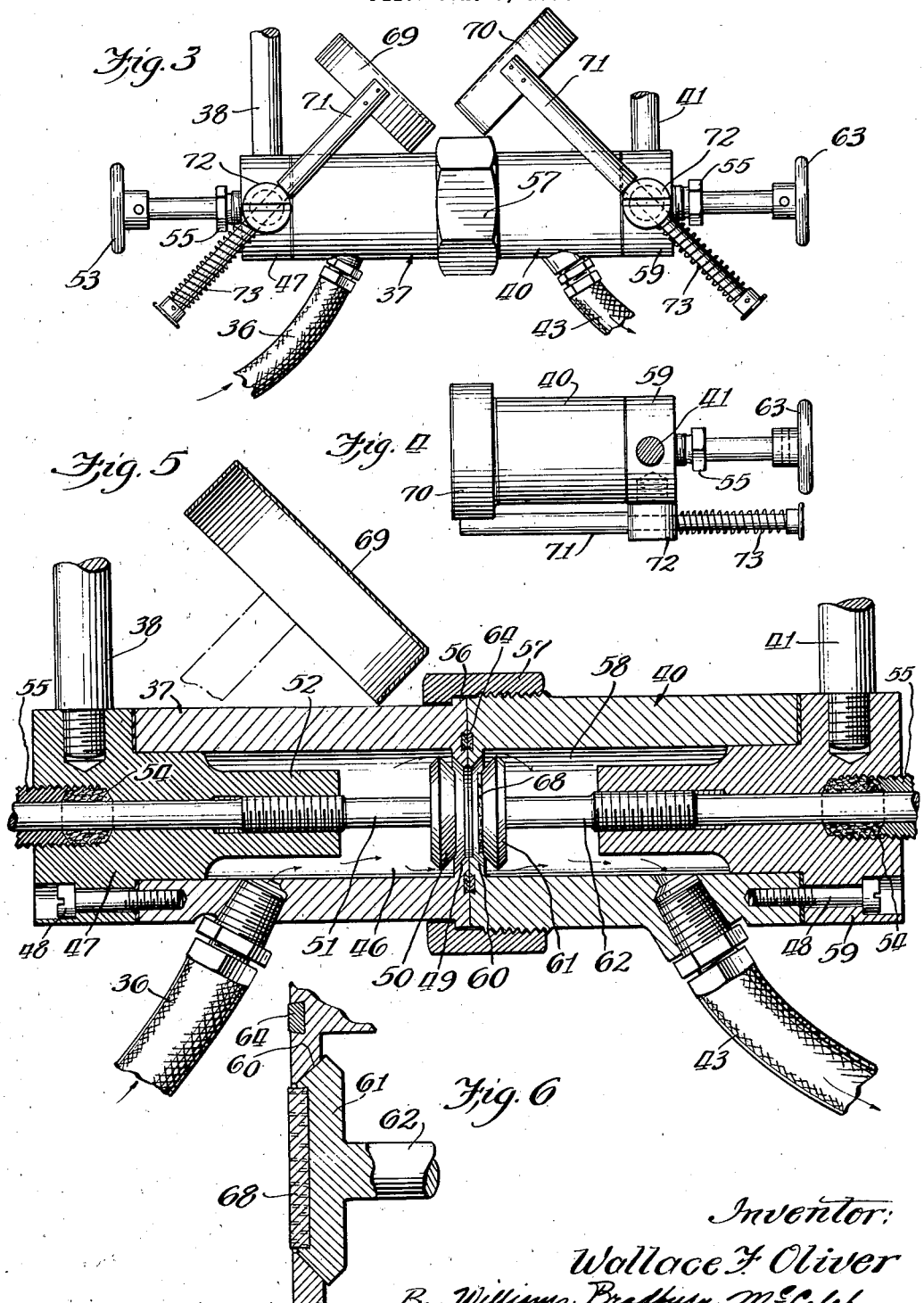
Inventor:
Wallace F. Oliver
By Williams, Bradbury, McCaleb
& Hinkle, Attys.

Patented Dec. 22, 1936

2,065,017

UNITED STATES PATENT OFFICE 2,065,017

HYDRAULIC BRAKE

Wallace F. Oliver, Detroit, Mich., assignor to Hydraulic Brake Company, Detroit, Mich., a corporation of California Application June 6, 1932, Serial No. 615,651

3 Claims. (Cl. 188—3)

My invention pertains to hydraulic brakes and is particularly concerned with the provision of a hydraulic brake especially adapted for use on automotive vehicles of the tractor and trailer type. In present trucking practice it is common to provide a tractor vehicle which is utilized to haul one or more trailer vehicles which are readily attachable to and detachable from the tractor vehicle. One of the important problems arising from the use of such tractor and trailer vehicles lies in the provision of adequate braking mechanism whereby brakes located at the wheels of the trailer vehicles may be accurately and satisfactorily controlled by the operator of the tractor vehicle.

An object of my invention is to provide a hydraulic brake system which will permit the driver of the tractor vehicle to control accurately and efficiently the brakes on one or more trailer vehicles connected with the tractor vehicle.

Another object is to provide a novel means for coupling the braking mechanism of the trailer vehicle with that of the tractor vehicle.

Another object is to provide means for positively sealing the fluid conduits on the several vehicles when the braking systems of the vehicles are disconnected from each other.

Another object is to provide inexpensive and effective means for locking the brakes of the trailer vehicle when such vehicle is disconnected from the tractor vehicle.

Another object is to provide simple and effective means for maintaining the fluid in the brake mechanism of the tractor and trailer vehicles under pressure prior to an uncoupling operation.

Another object is to provide a coupling means for the conduits of tractor and trailer vehicles which may be connected and disconnected without the loss of fluid therefrom.

Other objects and advantages will become apparent as the description proceeds.

Fig. 1 is an elevation, partially in section, showing a tractor and trailer in coupled relation and emphasizing the braking mechanism of the two vehicles;

Fig. 2 is a diagrammatic view of the braking mechanism of the vehicles shown in Fig. 1;

Fig. 2a is a detailed sectional view through a preferred type of master cylinder and reservoir unit.

Fig. 3 is an elevation of the coupling means for the brake mechanisms of the two vehicles;

Fig. 4 is a plan view of one of the elements of the coupling mechanism shown in Fig. 3;

Fig. 5 is an enlarged sectional view of the mechanism shown in Fig. 3; and

Fig. 6 is a sectional view of a detail of the coupling means.

In the drawings, I have indicated a conventional automobile truck 10 as the tractor vehicle, and this truck is connected by a pin and link connection 11 with a trailer 12. The truck is provided with the usual brake pedal 13 pivoted at 14 to the frame of the vehicle and provided with an arm 15 attached to a link 16 for actuating lever 17 splined to oscillable shaft 18.

The shaft 18 extends into a housing 19 which serves as a fluid reservoir and which contains a compression cylinder 20 having a piston 21 reciprocated by arm 22 likewise splined to the shaft 18. The reservoir 19, cylinder 20 and attendant mechanism, constitute the reservoir and master cylinder unit of a hydraulic brake system.

The piston 21 is provided with diagonal ducts 80 which are closed during forward movement of the piston by a rubber cup 81 held against the face of the piston by a metal cup 82 acted upon by the piston return spring 83. The other end of the spring 83 rests upon the return valve member 84 of a two-way check valve which includes an outlet valve 85 normally maintained in closed position by a light spring 86. In the rest position of the parts, the interior of the cylinder 20 is in open communication with the reservoir through cylinder port 87 and openings 88 in the metal cup 82. The interior of the reservoir communicates with atmosphere by way of two-way valve 89 located in the filling opening.

The discharge end of the compression cylinder 20 communicates with conduits 23 and 24 leading to cylinders 25 located at the vehicle wheels. These wheel cylinders may be of the type shown in my Patent No. 1,832,135, issued November 17, 1931, and actuate brake shoes 26 pivoted at 27 on a supporting pan 28 supported on the vehicle axle. The brake shoes 26 are returned to retracted position by spring 29.

In the present instance, the foot pedal pressure is augmented by a vacuum booster comprising a vacuum cylinder 30 connected to the intake manifold 31 by a conduit 32 having an interposed valve 33 controlled by the position of the foot pedal 13. The vacuum cylinder has a piston 34 connected to the link 16.

The discharge end of the compression cylinder 20 also communicates with a conduit 35 having a flexible section 36 leading to a coupling member 37 mounted on a pin 38 which is rotatable and vertically slidable in bracket 39 secured to the vehicle frame. The coupling member 37 is designed to cooperate with a similar coupling member 40 which is similarly mounted on a pin 41 supported by bracket 42 attached to the trailer frame.

The pin 41 is preferably coaxial with the pin of the coupling means 11. The coupling member 40 is connected to the flexible portion 43 of a conduit 44 having branches leading to wheel cylinders 45 which may be identical with the wheel cylinders 25 on the truck. The brake shoes and attendant mechanism actuated by the wheel cylinders 45 may be identical with that previously described as used on the truck 10. While Figure 2 shows only two of the trailer wheel brake assemblies, it is to be understood that the trailer shown in the drawings has four wheels, each of which is provided with a brake assembly.

Referring particularly to Figs. 3 to 6, inclusive, it is apparent that the coupling member 37 includes a cylinder 46 in open communication with the flexible conduit portion 36. The cylinder 46 is closed at one end by a head 47 secured to the cylinder 46 by suitable bolts 48. The other end of the cylinder 46 is provided with a valve seat 49 adapted to be closed by a valve 50 when the tractor and trailer are disconnected.

The valve 50 has a valve stem 51 threadedly engaging a reduced extension 52 of the head 47 and is provided with a hand wheel 53 for opening and closing the valve. A packing 54 and gland nut 55 are provided to prevent leakage around the valve stem 51.

The cylinder 46 is provided with a flange 56 for retaining coupling sleeve 57 which is adapted to be threadedly engaged with the cylinder 58 of the complementary coupling member when the parts are in coupled relation. The cylinder 58 is provided with a head 59, valve seat 60, valve 61, valve stem 62, and hand wheel 63 substantially identical with those described in connection with cylinder 46. The contacting faces of cylinders 46 and 58 are provided with sealing rings 64 which are preferably of lead or similar material suitable for forming a leak-proof seal therebetween.

With the parts in coupled relation and the valves 50 and 61 in open position, as indicated in Figs. 2 and 5, the conduit 44 of the trailer vehicle is in free communication with conduits 23 and 24 and the discharge end of the compression cylinder 20, so that operation of the foot-pedal 13 will apply the brakes on both the tractor and trailer vehicles. If it be desired to disconnect the trailer from the tractor and leave the brakes of the trailer in set positon, the driver first depresses the foot-pedal 13 until the desired pressure is created on the brakes of the tractor and trailer vehicles, whereupon the driver uses his other foot to move the slide 65 into engagement with one of the teeth 66 on the foot-pedal 13, thereby locking the foot-pedal against the action of the return spring 67, and holding the brake systems of the tractor and trailer under pressure. The driver then descends from the cab of the truck and rotates the hand wheels 53 and 63 to close the valves 50 and 61.

The valve 61 is provided with a compressible gasket 68 of cork or other suitable material, which completely fills the very small space between the opposed ends of the valves, thereby preventing the presence of any liquid between the ends of the coupling members 37 and 40 when they are uncoupled, and thus avoiding any possibility of loss of fluid as a result of the uncoupling operation.

After valves 50 and 61 are tightly seated, the driver unscrews coupling ring 27 until the coupling members 37 and 40 are disconnected. After the coupling members 37 and 40 are disconnected, they may be swung so that their ends are no longer in contact, whereupon covers 69 and 70 may be moved to positions covering the ends of the coupling members, thereby protecting these ends from dirt and corrosion. The covers 69 and 70 are carried by rods 71 slidably mounted in pivot pins 72 and held in selected positions by springs 73.

After the driver has disconnected the coupling members 37 and 40, he may withdraw the pin of the pin and slot connection 11, release the brake on the tractor by withdrawing the slide 65, and move the tractor away under its own power, leaving the trailer in any desired location with its brake set so that it cannot move therefrom.

Under some conditions it may be desired to move the trailer from place to place without first connecting it to a tractor vehicle, and under such conditions it will be necessary to provide means for releasing the brakes on the trailer to permit such movement. For this purpose I have provided the brake mechanism of the trailer with a cylinder 74 having a piston 75 normally maintained in its advanced position by a hand brake lever 76 having the usual ratchet mechanism 77.

When it is desired to move the trailer, it is only necessary to release the ratchet mechanism 77, thereby permitting the piston 75 to move to retracted position, whereupon the brakes on the trailer are immediately released. The trailer may then be pushed from one location to another, and when it is again desired to set the brakes of the trailer, it is only necessary to pull back on the hand brake lever 76 to advance the piston 75 and lock it in such advanced position.

The cylinder 74 is preferably provided with a filling opening and removable cover therefor, indicated by the reference character 78 in Fig. 2 of the drawings.

In the normal operation of the truck and trailer assembly a depression of the foot pedal 13 will advance the master cylinder piston 21, thereby displacing fluid from the master cylinder 20 and actuating the motor cylinders 25 on the tractor and motor cylinders 45 on the trailer to cause these motor cylinders to apply the brake shoes connected therewith. When the driver withdraws his foot from the pedal 13, this pedal is immediately returned to retracted position by spring 67. The piston operating arm 22 returns with the foot pedal 13 and permits spring 83 to return master cylinder piston 21.

Spring 83 returns the master cylinder piston 21 faster than the fluid can be returned to the master cylinder 20 by the return of the motor cylinder pistons under the influence of the retractile springs associated with the brake shoes. This results in the creation of suction in the master cylinder which draws fluid from the reservoir through ducts 80 in the piston and past collapsed rubber cup 81. In the rare instances in which leakage has occurred during the operation of the brakes, the fluid thus drawn into the master cylinder compensates for such leakage.

Normally, no such leakage occurs, and the fluid thus drawn past the master cylinder piston during its return stroke, constitutes an excess which is returned to the reservoir through the port 87 as the wheel cylinder pistons are completely retracted by the retractile springs attached to the brake shoes. Any small bubbles of air which may have found their way into the motor cylinders or conduits are returned to the master cylinder by the returning fluid upon the completion of each braking operation. From the master cylinder these minute bubbles of air are carried to the reservoir by the excess fluid returned thereto and thus the system is continually maintained free of air bubbles and completely filled with an incompressible liquid. It is to be noted that the two-way valve 84 normally maintains the conduits and wheel cylinders under a superatmospheric pressure which inhibits the leakage of atmospheric air into the conduits and wheel cylinders.

A further feature of my invention lies in the provisions for compensating for volumetric changes in the fluid contents of the conduits and wheel cylinders of both the truck and trailer. In the event of a sudden decrease in atmospheric temperature, the resultant volumetric contraction of the fluid in the wheel cylinders and conduits of the truck and trailer will draw additional fluid from the reservoir through port 87 and past outlet valve 85 to maintain the conduits and wheel cylinders completely filled at all times. Conversely, a rise in atmospheric temperature, accompanied by a volumetric increase in the fluid contained in the wheel cylinders and conduits of the truck and trailer, will return fluid to the master cylinder and reservoir past inlet valve 84 and through port 87, whereby dragging of the brakes is prevented.

The coupling means illustrated and described herein is claimed in my divisional application, Serial No. 733,221, filed June 30, 1934.

While I have illustrated and described a preferred embodiment of my invention, it is to be understood that my invention is capable of numerous adaptations and that the scope of my invention is limited solely by the following claims.

I claim:

1. In a hydraulic brake system of the class described, the combination of a compressor having a piston therein, a first conduit system connected to said compressor, a motor connected to said conduit system and actuated by liquid pressure created therein by said compressor, a brake element operated by said motor, a second conduit system, a motor connected to said second conduit system and actuated by liquid pressure created therein, a brake element operated by said last named motor, said motors designed for complete operation by a single stroke of said piston, detachable coupling means whereby said conduit systems may be connected in liquid transferring relationship and thereafter disconnected and sealed from atmosphere without admission of air to either conduit system, means provided by said compressor for maintaining all of said conduit systems and motors free of entrapped air, and means for operating said compressor.

2. In a hydraulic brake system of the class described, the combination of a compressor having a piston therein, a first conduit system connected to said compressor, motors connected to said conduit system and actuated by liquid pressure created therein by said compressor, brake elements operated by said motors, a second conduit system, motors connected to said second conduit system and actuated by liquid pressure created therein, brake elements operated by said last-named motors, all of said motors designed for complete operation by a single stroke of said piston, detachable coupling means whereby said conduit systems may be connected in liquid transferring relationship and thereafter disconnected and sealed from atmosphere without admission of air to or leakage of liquid from either conduit system, means provided by said compressor for compensating for volumetric changes in the liquid contained in said motors and conduit systems and for maintaining all of said motors and conduit systems free of entrapped air, and operating means for said compressor.

3. In a hydraulic brake system of the class described, the combination of a compressor having a piston therein, a first conduit system connected to said compressor, motors connected to said conduit system and actuated by liquid pressure created therein by said compressor, brake elements operated by said motors, a second conduit system, motors connected to said second conduit system and actuated by liquid pressure created therein, brake elements operated by said last-named motors, all of said motors designed for complete operation by a single stroke of said piston, detachable coupling means whereby said conduit systems may be connected in liquid transferring relationship and thereafter disconnected and sealed from atmosphere without admission of air to or leakage of liquid from either conduit system, means provided by said compressor for compensating for volumetric changes in the liquid contained in said motors and conduit systems and for maintaining all of said motors and conduit systems free of entrapped air, means for operating said compressor, and a second compressor connected to said second conduit system for controlling the latter when disconnected from said first conduit system.

WALLACE F. OLIVER.